(12) United States Patent
Kiribayashi

(10) Patent No.: US 7,823,683 B2
(45) Date of Patent: Nov. 2, 2010

(54) VEHICULAR COLLISION DETECTION APPARATUS

(75) Inventor: Shinichi Kiribayashi, Anjo (JP)

(73) Assignee: Denso Corporation, Kariya (JP)

( * ) Notice: Subject to any disclaimer, the term of this patent is extended or adjusted under 35 U.S.C. 154(b) by 210 days.

(21) Appl. No.: 12/218,338

(22) Filed: Jul. 14, 2008

(65) Prior Publication Data
US 2009/0020353 A1 Jan. 22, 2009

(30) Foreign Application Priority Data

Jul. 17, 2007 (JP) ............................. 2007-186067
Jun. 3, 2008 (JP) ............................. 2008-145974

(51) Int. Cl.
*B60K 28/10* (2006.01)
(52) U.S. Cl. ...................... 180/274; 280/735; 340/436; 701/45
(58) Field of Classification Search ................. 180/274; 280/735; 340/436; 701/1, 45
See application file for complete search history.

(56) References Cited

U.S. PATENT DOCUMENTS

| | | | |
|---|---|---|---|
| 6,561,301 B1 * | 5/2003 | Hattori et al. ............... | 180/274 |
| 7,131,512 B2 | 11/2006 | Aoki | |
| 7,137,472 B2 | 11/2006 | Aoki | |
| 7,331,415 B2 * | 2/2008 | Hawes et al. ................ | 180/274 |
| 2005/0104721 A1 * | 5/2005 | Mae et al. .................... | 340/436 |
| 2005/0116817 A1 | 6/2005 | Mattes et al. | |
| 2006/0087417 A1 | 4/2006 | Kiribayashi | |
| 2006/0237255 A1 * | 10/2006 | Wanami et al. ............. | 180/274 |
| 2007/0039772 A1 * | 2/2007 | Stuve .......................... | 180/274 |
| 2007/0181359 A1 * | 8/2007 | Mader ......................... | 180/274 |
| 2007/0227797 A1 * | 10/2007 | Takahashi et al. ........... | 180/274 |
| 2008/0238641 A1 * | 10/2008 | Mader ......................... | 340/436 |

FOREIGN PATENT DOCUMENTS

| | | |
|---|---|---|
| JP | 2000-264142 | 9/2000 |
| JP | 2004-003938 | 1/2004 |

(Continued)

OTHER PUBLICATIONS

Machine Translation of JP 2004-196239 (cited by Applicant).*

(Continued)

*Primary Examiner*—Toan C To
*Assistant Examiner*—Joseph Rocca
(74) *Attorney, Agent, or Firm*—Harness, Dickey & Pierce, PLC

(57) ABSTRACT

A collision detection apparatus for a vehicle includes a bumper reinforcement, a chamber forming member, a pressure sensor, collision object determining unit, and a collision position sensor. The bumper reinforcement is mounted on the vehicle and extends in a transverse direction of the vehicle. The chamber forming member is provided at a side of the bumper reinforcement and defines a chamber space that is deformable when the object collides with the vehicle. The pressure sensor detects pressure in the chamber space. The collision object determining unit determines a category of the object by comparing the pressure detected by the pressure sensor with a predetermined determination threshold value. The collision position sensor detects a transverse position, at which the object collides. The determining unit changes the determination threshold value based on the collision position detected by the collision position sensor.

16 Claims, 3 Drawing Sheets

FOREIGN PATENT DOCUMENTS

| | | |
|---|---|---|
| JP | 2004-196239 | 7/2004 |
| JP | 2005-538881 | 12/2005 |
| JP | 2006-117157 | 5/2006 |
| WO | WO 2004/058545 | 7/2004 |
| WO | WO 2005098384 A1 * | 10/2005 |
| WO | WO 2005110819 A1 * | 11/2005 |

OTHER PUBLICATIONS

Faxed literal translation of a portion of JP 2004-196239, a reference cited in previous office action.*

Office action dated Jun. 25, 2009 in corresponding Japanese Application No. 2008-145974.

* cited by examiner

VEHICULAR COLLISION DETECTION APPARATUS

CROSS REFERENCE TO RELATED APPLICATION

This application is based on and incorporates herein by reference Japanese Patent Application No. 2007-186067 filed on Jul. 17, 2007 and Japanese Patent Application No. 2008-145974 filed on Jun. 3, 2008.

BACKGROUND OF THE INVENTION

1. Field of the Invention

The present invention relates to a vehicular collision detection apparatus for a vehicle, which apparatus detects an object colliding with the vehicle, and which apparatus determines a category of the collision object.

2. Description of Related Art

Conventionally, apparatuses that detect collision of a vehicle with an object are described in, for example, JP-A-2005-538881 corresponding to US 2005/0116817 and JP-A-2006-117157 corresponding to US 2006/0087417. JP-A-2005-538881 describes a front sensor for a vehicle, which sensor has a sensing element in a cavity of the sensor. The front sensor uses the sensing element to detect the collision depending on deformation of the cavity. Also, JP-A-2006-117157 describes an apparatus that determines whether a collision object is a pedestrian based on change of pressure in the chamber space air-tightly formed between a bumper cover and a bumper reinforcement.

In general, a front end portion of the vehicle has a curved shape. In contrast, a front surface of a general bumper reinforcement has a shape that is not in parallel with the front end portion, but that is straight in a transverse direction of the vehicle. As a result, a chamber space defined between the bumper reinforcement and the front end portion (i.e., a bumper cover) has a length in the vehicle fore-and-aft direction, which length is changeable or different with a position in the vehicle transverse direction. Thus, the chamber forming member, which includes the chamber space, has a rigidity in the vehicle fore-and-aft direction changeable with a position in the vehicle transverse direction.

Also, a bumper absorber is disposed between the bumper cover and the bumper reinforcement in order to protect a leg of a pedestrian in a case, where the pedestrian collides with the bumper cover. In the above case, it is required that the bumper absorber be deformed but that the bumper cover be limited from contacting or being pressed against the bumper reinforcement. As above, the length of the chamber space in the vehicle fore-and-aft direction at end sections in the vehicle transverse direction is comparatively smaller relative to the fore-and-aft direction length of the chamber space at the center section of the chamber space. Thus, if rigidity of the bumper absorber or the chamber forming member is uniform in the vehicle transverse direction, the bumper cover may disadvantageously contact the bumper reinforcement in a case, where the pedestrian collides with the vehicle transverse direction end section. The above also applies to a case, where the chamber forming member serves as a bumper absorber.

Thus, in order to limit the bumper cover from contacting the bumper reinforcement even in a case, where a pedestrian collides with the bumper cover, the bumper absorber provided between the bumper cover and the bumper reinforcement has a variable rigidity in the vehicle fore-and-aft direction. In the above configuration, the variable rigidity is variably set based on the length of the chamber space in the vehicle fore-and-aft direction. Thus, the deformation amount of the chamber forming member varies depending on a position, at which the pedestrian collides with the bumper cover. As a result, disadvantageously, it has been difficult to highly accurately determine that the object, which collides with the bumper cover, is a pedestrian.

SUMMARY OF THE INVENTION

The present invention is made in view of the above disadvantages. Thus, it is an objective of the present invention to address at least one of the above disadvantages.

To achieve the objective of the present invention, there is provided a collision detection apparatus for a vehicle, wherein the collision detection apparatus detects collision of an object with the vehicle. The collision detection apparatus includes a bumper reinforcement, a chamber forming member, a pressure sensor, collision object determining means, and a collision position sensor. The bumper reinforcement is mounted on the vehicle, and the bumper reinforcement extends in a transverse direction of the vehicle. The chamber forming member is provided at a side of the bumper reinforcement, and the chamber forming member defines a chamber space that is deformable when the object collides with the vehicle. The pressure sensor detects pressure in the chamber space. The collision object determining means determines a category of the object by comparing the pressure detected by the pressure sensor with a predetermined determination threshold value. The collision position sensor detects a position in the vehicle transverse direction, at which position the object collides. The collision object determining means changes the determination threshold value based on the collision position detected by the collision position sensor.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

Figure 1:
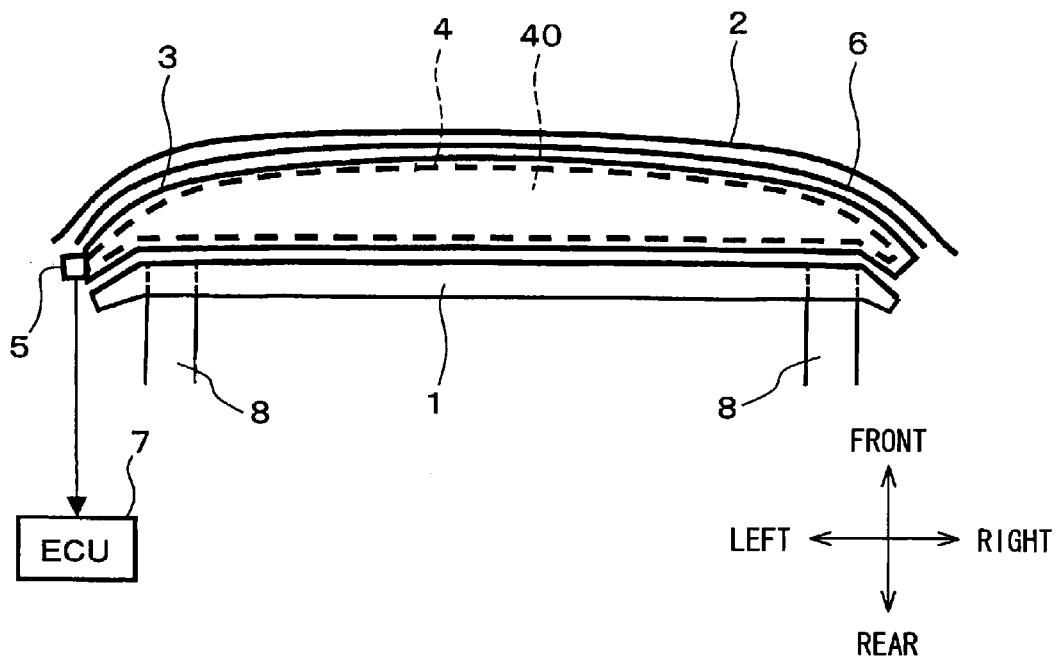
FIG. 1 is a horizontal cross-sectional view of a vehicle front part in a vehicular collision detection apparatus of one embodiment of the present embodiment.

One embodiment of the present invention is described with accompanying drawings. A vehicular collision detection apparatus of the present embodiment is described with reference to FIG. 1. FIG. 1 is a horizontal cross-sectional view of a vehicle front part in the vehicular collision detection apparatus of the present embodiment.

Mainly, the vehicular collision detection apparatus detects collision of an external object with a vehicle and determines whether the collision object is a pedestrian. The vehicular collision detection apparatus includes a bumper reinforcement 1, a bumper cover 2, a bumper absorber 3, a chamber forming member 4, a pressure sensor 5, a collision position sensor 6, and an electronic control unit (ECU) 7.

The bumper reinforcement 1 extends in a vehicle transverse direction (a transverse direction of the vehicle) and serves as a structure that constitutes a part of a vehicle frame. The bumper reinforcement 1 is a hollow metal structure and includes two beams that extend in the vehicle transverse direction. Also, the beams are arranged around a center of the bumper reinforcement 1 in a vertical direction inside the hollow structure and spaced away from each other, for example. Thus, the bumper reinforcement 1 has a cross section of a ladder-like shape. Also, the bumper reinforcement 1 is fixed to vehicle front end portions of front side members 8 that are provided at vehicle transverse ends. The bumper reinforcement 1 has a vehicle front surface shape of a straight line at most part of a center section of the bumper reinforcement 1 in the vehicle transverse direction. Also the vehicle front surface of the bumper reinforcement 1 is slightly angled toward a vehicle rear side at the end sections of the bumper reinforcement 1 in the vehicle transverse direction. The center section of the bumper reinforcement 1 in the vehicle transverse direction is named as the transverse center section of the bumper reinforcement 1, and the end section of the bumper reinforcement 1 in the vehicle transverse direction is named as the transverse end section of the bumper reinforcement 1, for example.

The bumper cover 2 is a curved plate having an arcuate shape when observed from above the vehicle and is provided at a forefront face of the vehicle. Thus, the bumper cover 2 covers a vehicle front side of the bumper reinforcement 1. As a result, the bumper cover 2 covers vehicle front sides of the bumper absorber 3 and the chamber forming member 4, accordingly. Thus, when the vehicle collides with an object located at a position frontward of the vehicle, the object usually collides with the bumper cover 2. Then, the bumper cover 2 is supported by the bumper absorber 3 such that the bumper cover 2 is displaceable relative to the bumper reinforcement 1 toward the vehicle rear side, or toward the rear side of the vehicle.

The bumper absorber 3 is made of a metal or a resin and has a tubular shape having a substantial rectangular cross section shape taken along a plane perpendicular to the vehicle fore-and-aft direction. The bumper absorber 3 is fixed to the bumper reinforcement 1 such that the bumper absorber 3 is provided between the bumper reinforcement 1 and the bumper cover 2 and extends in the vehicle transverse direction as shown in FIG. 1. Furthermore, the bumper absorber 3 supports the bumper cover 2 as described above. A vehicle front surface of the bumper absorber 3 has a curved shape, and a center section of the vehicle front surface in the vehicle transverse direction projects most toward the vehicle front side. Accordingly, the vehicle front surface accommodates with the shape of the bumper cover 2. In contrast, a vehicle back surface of the bumper absorber 3 has a straight line shape at most of a transverse center section of the vehicle back surface. Also, the vehicle back surface of the bumper absorber 3 is slightly tilted toward the vehicle rear side at the transverse end sections of the bumper absorber 3. As a result, the vehicle back surface of the bumper absorber 3 accommodates with the vehicle front surface of the bumper reinforcement 1. In other words, the bumper absorber 3 is shaped to have a length in the vehicle fore-and-aft direction, which length is longest at the transverse center section of the bumper absorber 3, and which becomes shorter toward the transverse end sections of the bumper absorber 3.

Further, the bumper absorber 3 defines therein a hollow space that receives the chamber forming member 4. Thus, the bumper absorber 3 has an inner surface that defines the above hollow space, and the inner surfaces of the bumper absorber 3 located on a vehicle front side and on a vehicle rear side thereof have respective shapes that are similar to shapes of outer surfaces of the bumper absorber 3 located on the vehicle front side and on the vehicle rear side thereof. In other words, the inner surface of the bumper absorber 3 located on the vehicle front side of the bumper absorber 3 has a curved shape that accommodates with a shape of the bumper cover 2 such that a center section of the bumper absorber 3 in the vehicle transverse direction projects foremost in a frontward direction of the vehicle. In contrast, the inner surface of the bumper absorber 3 on the vehicle rear side has a shape that accommodates with a front surface of the bumper reinforcement 1 such that most part of a transverse center section of the inner surface of the bumper absorber 3 has a straight shape. In the above, the front surface faces in a travel direction of the vehicle, or faces forward of the vehicle, for example. Also, transverse end sections of the inner surface of the bumper absorber 3 are slightly angled toward a rear side of the vehicle. In other words, the inner surface of the bumper absorber 3 has a length in the vehicle fore-and-aft direction, which length is the largest at the transverse center section of the inner surface of the bumper absorber 3, and becomes smaller toward the transverse end sections of the inner surface of the bumper absorber 3.

The above bumper absorber 3 is configured to collapse to be deformed when the external object collides with the vehicle front such that the bumper absorber 3 is able to absorb the force by the collision. In other words, for example, the bumper absorber 3 serves to protect a leg of a pedestrian when the pedestrian collides with the bumper cover 2.

A rigidity of the bumper absorber 3 in the vehicle fore-and-aft direction or along a longitudinal axis of the vehicle is variable with a length of the bumper absorber 3 in the vehicle fore-and-aft direction. The vehicle fore-and-aft direction corresponds to a longitudinal direction of the vehicle, for example. Specifically, the rigidity of the bumper absorber 3 is lowest at a transverse center section of the bumper absorber 3, and the rigidity becomes higher towards the transverse end sections of the bumper absorber 3. More specifically, the rigidity of the bumper absorber 3 around the transverse end section gradually becomes higher in a direction from the center section to the transverse end section. In other words, the rigidity of the bumper absorber 3 in the vehicle fore-and-aft direction depends on a rigidity of a chamber space 40 in the vehicle fore-and-aft direction. Specifically, the rigidity of the bumper absorber 3 in the vehicle fore-and-aft direction becomes lower at a position, where the rigidity of the chamber space 40 in the vehicle fore-and-aft direction is lower, and the rigidity of the bumper absorber 3 becomes higher at a position, where the rigidity of the chamber space 40 in the vehicle fore-and-aft direction is higher.

The chamber forming member 4 defines the chamber space 40 therein and has a rectangular shape. The above chamber space 40 is air-tightly formed. Specifically, the chamber forming member 4 has an outer surface shape that substantially accommodates with an inner surface shape of the bumper absorber 3. In other words, the outer surface of the chamber forming member 4 has a length in the vehicle fore-and-aft direction, which length is largest at a transverse center section, and becomes smaller toward the transverse end sections. The chamber forming member 4 is made of a resin that is easily deformable. The chamber forming member 4 is received in the hollow space of the bumper absorber 3 such that the chamber forming member 4 contacts the inner surface of the bumper absorber 3. In other words, the chamber forming member 4 is provided between the bumper reinforcement 1 and the bumper cover 2, similar to the bumper absorber 3.

Thus, in a case, where the bumper cover 2 collides with the external object, the bumper cover 2 is displaced relative to the bumper reinforcement 1 toward the rear of the vehicle, and upon the deformation of the bumper absorber 3, the chamber forming member 4 collapses or is deformed in the vehicle fore-and-aft direction. In other words, when the bumper cover 2 collides with the external object, the chamber space 40 is deformed. The chamber space 40 encloses air inside the chamber space 40. In a configuration, where the bumper absorber 3 is made of a resin, the bumper absorber 3 may serve as the chamber forming member 4, for example.

The chamber forming member 4 is configured to have a rigidity in the vehicle fore-and-aft direction, which rigidity is different or changeable with a length of the chamber forming member 4 in the vehicle fore-and-aft direction. Specifically, the chamber forming member 4 has the lowest rigidity at the center section in the vehicle transverse direction, and has the highest rigidity at the end sections in the vehicle transverse direction similarly to the bumper absorber 3. More specifically, the rigidity of the chamber forming member 4 at the end sections thereof in the vehicle transverse direction gradually becomes higher from the center section to the end section.

The rigidity of each of the bumper absorber 3 and the chamber forming member 4 in the vehicle fore-and-aft direction is different with the transverse position as above because of the following reasons. By making the rigidity as above, the bumper cover 2 is limited from contacting the bumper reinforcement 1, and thereby the bumper absorber 3 certainly absorb the impact or the force when a pedestrian collides with the bumper cover 2. In the above, the bumper cover 2 may not directly contact the bumper reinforcement 1, but the bumper cover 2 is limited from being pressed against the bumper reinforcement 1 to the end. Thus, the bumper reinforcement 1 is limited from blocking the bumper cover 2 from displacing toward the bumper reinforcement 1. Also, the rigidities of the bumper absorber 3 and the chamber forming member 4 are increased at the transverse end sections, where the separation distance between the bumper cover 2 and the bumper reinforcement 1 is short. As a result, even when the pedestrian collides with the transverse end sections, the bumper cover 2 is limited from contacting the bumper reinforcement 1, and thereby, an injury criteria for a leg of the pedestrian is limited from becoming worse.

The pressure sensor 5 senses pressure in the chamber space 40 of the chamber forming member 4. The pressure sensor 5 is assembled to a vehicle left end section of the bumper absorber 3 and of the chamber forming member 4, for example. The pressure sensor 5 transmits sensed pressure information to the ECU 7. In other words, the pressure sensor 5 senses change of the pressure in the chamber space 40 due to the deformation of the chamber forming member 4, in a case, where the bumper cover 2 collides with the external object.

The collision position sensor 6 is a long plate having a length similar to a length of the bumper absorber 3 in the vehicle transverse direction, and includes a known pressure-sensitive type switching sensor and known conductive rubber, for example. The collision position sensor 6 is mounted over an entirety of a front surface of the bumper absorber 3. The collision position sensor 6 senses a position of the external object on the bumper cover 2 in the vehicle transverse direction, which external object collides with the bumper cover 2 at the position. Then, the collision position sensor 6 transmits the sensed collision position information to the ECU 7.

The ECU 7 corresponding to collision object determining means determines whether the bumper cover 2 collides with the external object based on the pressure in the chamber space 40 sensed by the pressure sensor 5. Further, the ECU 7 determines whether the above collided external object (collision object) is a pedestrian (human body).

Figure 2:
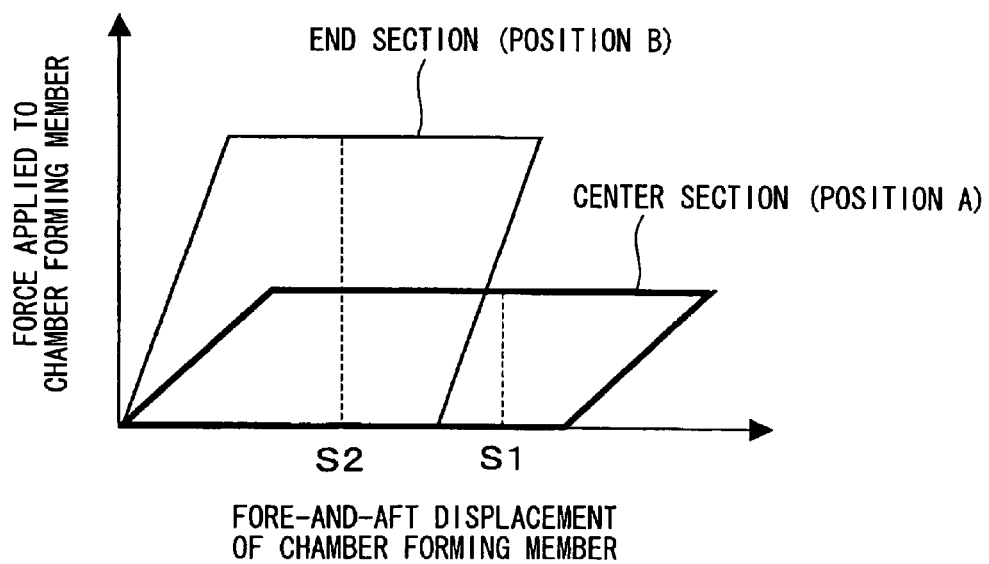
FIG. 2 is a diagram illustrating a relation between a displacement of a chamber space in a vehicle fore-and-aft direction and a force applied to a chamber forming member.
Figure 3:
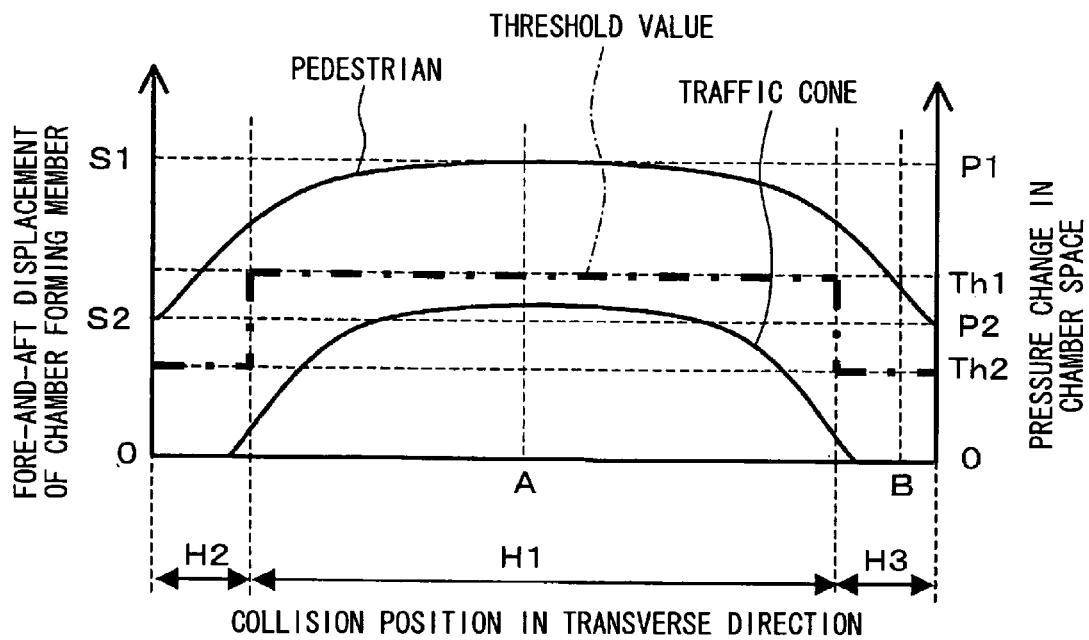
FIG. 3 is a diagram for explaining a determination threshold value used for determining a type of a collision object.

The determination executed by the ECU 7 for determining whether the collision object is the pedestrian is described with reference to FIGS. 2 and 3. FIG. 2 is a diagram illustrating the force applied to the chamber forming member 4 relative to the displacement of the chamber space 40 in the vehicle fore-and-aft direction. In FIG. 2, a thick solid line indicates the above relation at the transverse center section (a position A in FIG. 3) of the bumper cover 2, and a thin solid line indicates the above relation at an transverse end section (a position B in FIG. 3) of the bumper cover 2. FIG. 3 is a diagram for explaining a determination threshold value used for determining a category or a type of the collision object. Specifically, in FIG. 3, an abscissa axis indicates a position on the bumper cover 2 in the vehicle transverse direction, at which the external object collides with the bumper cover 2. Also, a left ordinate axis indicates a displacement amount of the chamber forming member 4 in the vehicle fore-and-aft direction, and a right ordinate axis indicates a change amount of the pressure in the chamber space 40.

The chamber forming member 4 plastically deforms when the deformation amount of the chamber forming member 4 goes beyond a small range of an elastic deformation as shown by a thin solid line and a thick solid line in FIG. 2. The end sections of the bumper absorber 3 and the chamber forming member 4 having higher rigidity in the vehicle fore-and-aft direction have a larger slope or gradient in the elastic deformation range than the center sections thereof. Also, the end sections of the bumper absorber 3 and the chamber forming member 4 starts the plastic deformation at a larger force than the center sections thereof.

FIG. 3 shows the displacement of the chamber forming member 4 and the pressure change in the chamber space 40 in accordance with the collision position using two examples of a pedestrian and a traffic cone. As shown in FIG. 3, in a case, where the pedestrian collides with the transverse center section of the bumper cover 2, a displacement amount of the chamber forming member 4 in the vehicle fore-and-aft direction indicates S1. In the above case, the pressure in the chamber space 40 indicates P1. In contrast, in a case, where the pedestrian collides with the transverse end section of the bumper cover 2, the displacement amount of the chamber forming member 4 in the vehicle fore-and-aft direction indicates S2. In the above case, the pressure in the chamber space 40 indicates P2.

Also, in a case, where the traffic cone collides with the transverse center section of the bumper cover 2, the displacement amount of the chamber forming member 4 in the vehicle fore-and-aft direction indicates slightly larger than S2. In contrast, in another case, where the traffic cone collides with the transverse end section of the bumper cover 2, the chamber forming member 4 is only slightly deformed. In other words, the displacement amount of the chamber forming member 4 and the pressure in the chamber space 40 decreases as a function of the collision position of the external object on the bumper cover 2 from the center section toward the end section. The above relation is caused correspondingly by the rigidity of the bumper absorber 3 and the chamber forming member 4 in the vehicle fore-and-aft direction.

The ECU 7 changes a determination threshold variable Th depending on the collision position of the external object sensed by the collision position sensor 6. Specifically, as shown by the dashed and single-dotted line in FIG. 3, in a case, where the collision position on the bumper cover 2 corresponds to a position in a center section range H1 on the abscissa axis, the determination threshold variable Th is set as a constant or a value Th1 that is smaller than P1 and larger than P2. Also, similarly, the determination threshold variable Th for end section ranges H2, H3 is set as Th2 that is smaller than P2. In the above, the center section range H1 includes a position that corresponds to the transverse center section of the bumper cover 2, and the end section ranges H2, H3 correspond to the transverse end sections of the bumper cover 2.

Also, the ECU 7 determines that the collision object is a pedestrian when the change amount of the pressure in the chamber space 40 sensed by the pressure sensor 5 exceeds the determination threshold value Th1 or Th2, which has been set accordingly to the collision position as above. In contrast, the ECU 7 determines the collision object is not a pedestrian when the change amount of the pressure in the chamber space 40 is equal to or less than the determination threshold value Th1 or Th2.

When the ECU 7 determines that the collision object is the pedestrian, the pedestrian protection device (not shown) is activated. For example, the pedestrian protection device is mounted on a hood of the vehicle, and protects the pedestrian in a case, where the vehicle collides with the pedestrian. The pedestrian protection device, for example, may lift up the hood, or may be an air bag unit for inflating an air bag over the hood.

Figure 4:
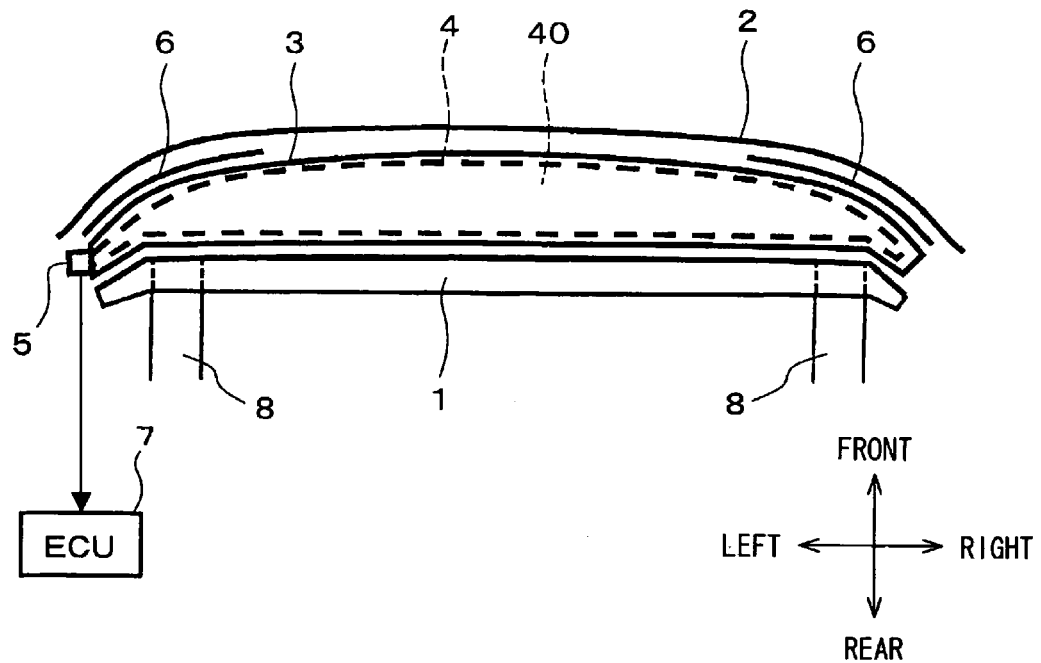
FIG. 4 is a horizontal cross-sectional view of a vehicle front part in a vehicular collision detection apparatus of another embodiment of the present invention.
Figure 5:
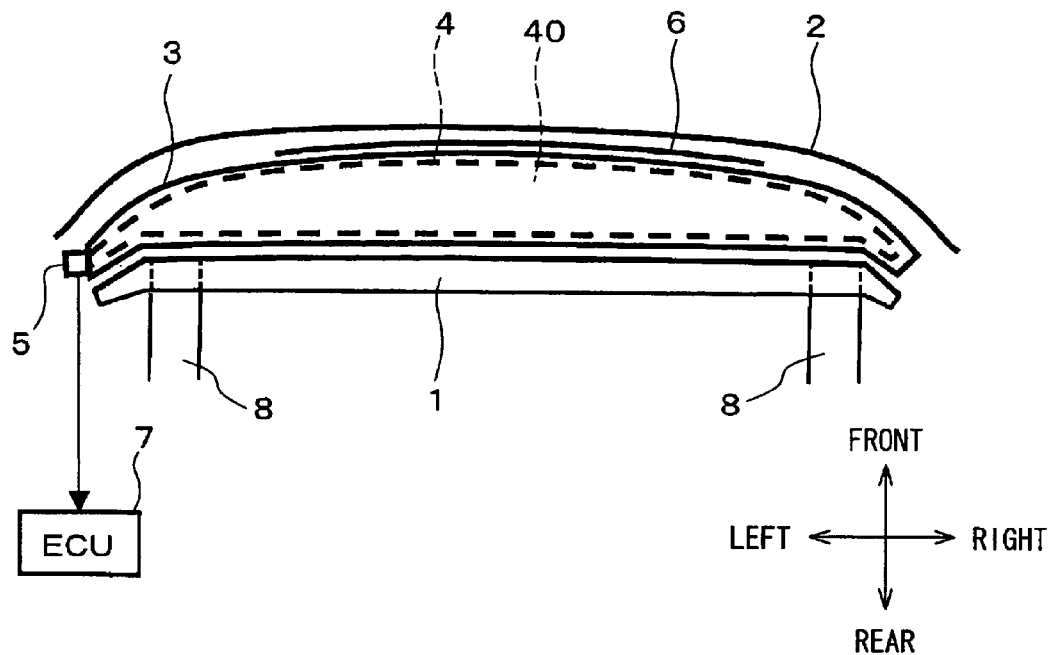
FIG. 5 is a horizontal cross-sectional view of a vehicle front part in a vehicular collision detection apparatus of a further another embodiment of the present invention.
Figure 6:
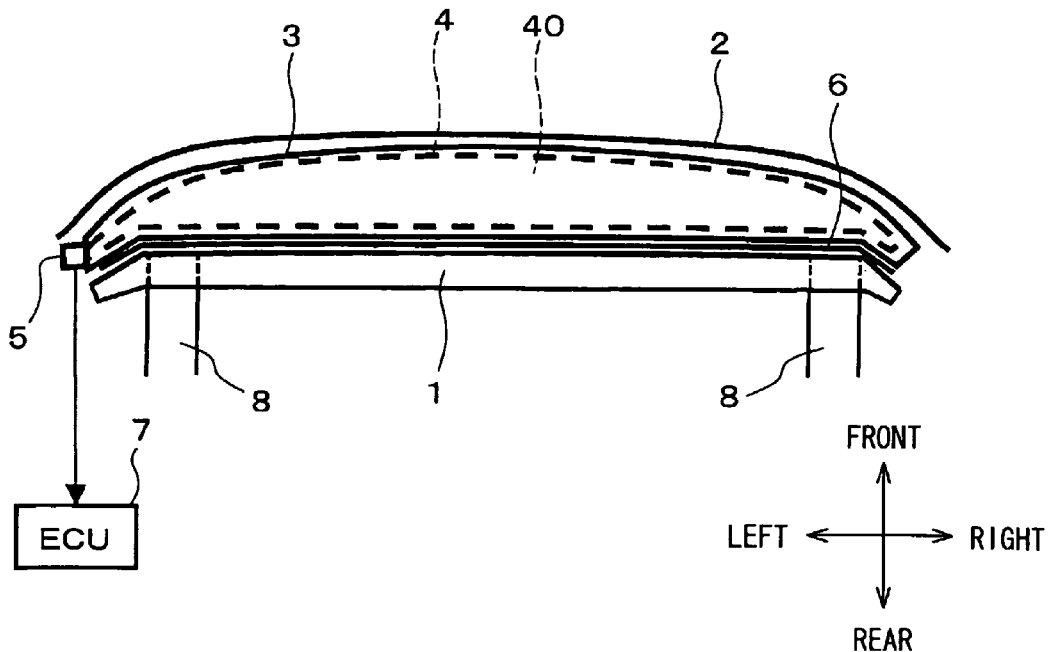
FIG. 6 is a horizontal cross-sectional view of a vehicle front part in a vehicular collision detection apparatus of a further another embodiment of the present invention.

In the above embodiment, the collision position sensor 6 is mounted over the entirety of the vehicle front surface of the bumper absorber 3. However, the collision position sensor 6 may be alternatively mounted on a part of the vehicle front surface of the bumper absorber 3. Specifically, as shown in FIG. 4, the collision position sensors 6 may be assembled to positions of the vehicle front surface of the bumper absorber 3, which positions correspond to the end section ranges H2, H3 in FIG. 3. Also, as shown in FIG. 5, the collision position sensor 6 may be assembled to a position of the vehicle front surface of the bumper absorber 3, which position corresponds to the center section range H1 in FIG. 3. Further, as shown in FIG. 6, the collision position sensor 6 may be assembled to the vehicle back surface of the bumper absorber 3 provided that the collision position sensor 6 senses the collision position of the external object. Also, in the above embodiment, the determination threshold variable Th indicates two values stepwisely. However, the determination threshold variable Th may indicate three or more values stepwisely. Also, the determination threshold variable Th may be continuously variable with the collision position.

Also, in the above embodiment, the rigidity of the bumper absorber 3 in the vehicle fore-and-aft direction is made different with the position in the vehicle transverse direction, and also, the rigidity of the chamber forming member 4 in the vehicle fore-and-aft direction is made different with the position in the vehicle transverse direction. In other words, the rigidity of the bumper absorber 3 in the vehicle fore-and-aft direction is determined or is variable as a function of a transverse position in the bumper absorber 3. Also, the rigidity of the chamber forming member 4 in the vehicle fore-and-aft direction is determined or is variable as a function of a transverse position in the chamber forming member 4. However, the rigidity is not limited to the above. For example, the rigidity of the bumper absorber 3 in the vehicle fore-and-aft direction is made different with the position in the vehicle transverse direction, and at the same time, the rigidity of the chamber forming member 4 in the vehicle fore-and-aft direction may be alternatively kept constant at any position in the vehicle transverse direction. The above alternative example is substantially applicable similarly to the above embodiment. Also, alternatively, the rigidity of the bumper absorber 3 in the vehicle fore-and-aft direction may be kept constant at any position in the vehicle transverse direction, and the rigidity of the chamber forming member 4 in the vehicle fore-and-aft direction is made different with the position in the vehicle transverse direction. The above another alternative example is substantially applicable similarly to the above embodiment. In the above alternative examples, the determination threshold value may be adjusted as required relative to the above embodiment, and other configurations are similar to the above embodiment.

In the above embodiment, the bumper absorber 3 and the chamber forming member 4 are described as separate members. However, the configuration of the bumper absorber 3 and the chamber forming member 4 is not limited to the above. For example, the bumper absorber 3 may be formed integral with the chamber forming member 4. In other words, the chamber forming member 4 may alternatively serve as the bumper absorber. In the above alternative example, the advantages as described in the above embodiment are achieved. In the alternative example, a cost for an entire system is reduced, and the manufacturing steps in the assembly to the vehicle is reduced.

According to the collision detection apparatus of the above embodiments, the collision object determining means (ECU) 7 changes the determination threshold value in accordance with the position in the vehicle transverse direction, at which position the object collides. Thus, even when change of the pressure in the chamber space 40 caused by the collision of the object changes with a position in the chamber space 40 in the vehicle transverse direction, it is possible to determine a category or a type of the collision object.

It should be noted that an integrated value may be obtained by integrating the pressure value for a predetermined time section. The above integrated value corresponds to a deformation amount of the chamber. Then, it may be determined a type of the collision object by comparing the above integrated value with a predetermined determination threshold value.

Also, the collision object determining means (ECU) 7 determines that the object is a human body when the pressure value detected by the pressure sensor 5 is greater than the determination threshold value Th1, Th2 as above. In other words, the collision detection apparatus of the above embodiment is able to detect that the vehicle collides with the pedestrian. The change amount of the pressure in the chamber space 40 with the transverse position in the chamber space 40 may not be large. Thus, because the pedestrian is substantially light weighted and has low rigidity compared with the vehicle, the change of the pressure in the chamber space 40, which change depends on the position, may have a considerable influence in performance in a comparison example or in a conventional art. However, in the above embodiment, even when the pedestrian, which causes a small change amount in the pressure in the chamber space 40, collides with the vehicle, it is possible to reliably determine that the object, which collides with the vehicle, is a pedestrian.

Also, in the embodiment, the chamber forming member 4 has a rigidity in the vehicle fore-and-aft direction, which rigidity is changeable with the position in the vehicle transverse direction as above. Thus, the deformation amount of the chamber forming member 4 changes with the transverse position, at which the object collides. In other words, depending on the transverse position of the vehicle, at which position the collision of the object occurs, the change amount of the pressure in the chamber space 40 varies. In the above case, because the determination threshold value is appropriately changed as described in the above embodiment, it is possible to highly accurately determine a type of the collision object.

Also, in the above embodiment, the bumper absorber 3 has a rigidity in the vehicle fore-and-aft direction, which rigidity changes correspondingly with the rigidity of the chamber forming member 4. The bumper absorber 3 is provided forward of the chamber forming member 4 or is provided on a side of the chamber forming member 4, which side faces in a travel direction of the vehicle. The chamber forming member 4 has the rigidity in the vehicle fore-and-aft direction that is changeable with the position in the vehicle transverse direction, and further the bumper absorber 3 may also have a rigidity in the vehicle fore-and-aft direction that is changeable with the position in the vehicle transverse direction. In the above case, the change amount of the pressure in the chamber space 40 due to the collision position varies under the influence by the rigidity of the chamber forming member 4 and the rigidity of the bumper absorber 3. Thus, in the above embodiment, it is possible to appropriately determine the type of the collision object in consideration of the rigidity of each of the chamber forming member 4 and the bumper absorber 3.

Also, the chamber forming member 4 has the rigidity in the vehicle fore-and-aft direction that is changeable with a length of the chamber space 40 in the vehicle fore-and-aft direction. In the above case, the determination threshold value may be changed depending on the length of the chamber space 40 in the vehicle fore-and-aft direction.

Also, the bumper absorber 3 may have the rigidity in the vehicle fore-and-aft direction that changes with the length of the bumper absorber 3 in the vehicle fore-and-aft direction. In the above case, the determination threshold value may be changed depending on the length of the bumper absorber 3 in the vehicle fore-and-aft direction.

Also, the chamber forming member 4 has the rigidity in the vehicle fore-and-aft direction that is higher at the transverse end section than at the transverse center section of the chamber forming member 4. The determination threshold value is set lower when the collision position corresponds to the transverse end section than when the collision position corresponds to the transverse center section. In other words, the determination threshold value is set lower for a collision that occurs at the transverse end section of the vehicle component than for another collision that occurs at the transverse center section.

Also, the rigidity of each of the chamber forming member 4 and the bumper absorber 3 in the vehicle fore-and-aft direction is made such that the rigidity of the transverse end section is higher than the rigidity of the transverse center section. The determination threshold value for the collision occurring at the transverse end section is set lower than the determination threshold value for the collision occurring at the transverse center section.

The chamber forming member 4 has the length in the vehicle fore-and-aft direction narrower at the transverse end section than at the transverse center section. Thus, when the pedestrian collides with the transverse end section of the bumper cover 2, there is a need for limiting the bumper cover 2 from contacting the bumper reinforcement 1, and thereby limiting the impact for the leg of the pedestrian. Otherwise, injury criteria for the leg of the pedestrian becomes worse. Thus, the rigidity of the bumper absorber 3 and the chamber forming member 4 in the vehicle fore-and-aft direction is made such that the rigidity of the transverse end section is higher than the rigidity of the transverse center section. As above, the determination threshold value is set lower for the collision that occurs at the transverse end section than for the collision that occurs at the transverse center section. As a result, the appropriate determination threshold value is set accordingly to the collision position, and thereby the type of the collision object is highly accurately determined.

Also, the collision position sensor 6 may be provided at one of the transverse end section and the transverse center section as above embodiment. Thus, by providing the collision position sensor 6 to one of the transverse end section and the transverse center section, the cost is reduced, and the assembly of the collision position sensor 6 is facilitated.

Note that, in a case, where the collision position sensor 6 is attached to only a part of the vehicle in the vehicle transverse direction, the collision position may not be detected in detail when the object collides with the other part of the vehicle other than the sensor assembled part. In the above configuration, the length of the chamber space 40 in the vehicle fore-and-aft direction at the transverse center section is substantially uniform. Thus, if it is detected whether the collision position of the object corresponds to the transverse center section or the transverse end section, the determination threshold variable may be changed based on the above detection such that the type of the collision object is adequately accurately detected.

Also, around the transverse end section, the length of the chamber space in the vehicle fore-and-aft direction gradually becomes narrower in a direction from the transverse center section to the transverse end section. Thus, if the collision position sensor 6 is provided at the transverse end section, the determination threshold variable Th at the transverse end section is minutely changed or set. As a result, the type of the collision object is highly accurately determined.

Also, for example, the collision position sensor 6 may be provided at the vehicle front surface of the chamber forming member 4. In a case, where the object collides with the bumper cover 2, the vehicle front surface of the chamber forming member 4 is certainly pressed by the bumper cover 2. As a result, by providing the collision position sensor 6 at the vehicle front surface of the chamber forming member 4, the object collision position on the bumper cover 2 is reliable detected. Note that, the collision position sensor 6 may be provided to the vehicle back surface of the chamber forming member 4 provided that the collision position is detected.

Additional advantages and modifications will readily occur to those skilled in the art. The invention in its broader terms is therefore not limited to the specific details, representative apparatus, and illustrative examples shown and described.

What is claimed is:

1. A collision detection apparatus for a vehicle, wherein the collision detection apparatus detects collision of an object with the vehicle, the collision detection apparatus comprising:
   a bumper reinforcement that is mounted on the vehicle, the bumper reinforcement extending in a transverse direction of the vehicle;
   a chamber forming member that is provided at a side of the bumper reinforcement, the chamber forming member defining a chamber space that is deformable when the object collides with the vehicle;
   a pressure sensor that detects pressure in the chamber space;

collision object determining means for determining a category of the object by comparing the pressure detected by the pressure sensor with a predetermined determination threshold value; and a collision position sensor that detects a position in the vehicle transverse direction, at which position the object collides, wherein the collision object determining means changes the determination threshold value based on the collision position detected by the collision position sensor, wherein:

the chamber forming member has a rigidity in a fore-and-aft direction of the vehicle, which rigidity changes with a position in the chamber forming member in the vehicle transverse direction;

the rigidity of the chamber forming member in the vehicle fore-and-aft direction is higher at an end section of the chamber forming member in the vehicle transverse direction than at a center section of the chamber forming member in the vehicle transverse direction;

the determination threshold value is set lower when the collision position corresponds to the end section than when the collision position corresponds to the center section; and the chamber forming member has a length in the fore-and-aft direction of the vehicle, which length is largest at the center section, and which length becomes smaller toward the end section.

2. The collision detection apparatus according to claim 1, wherein the collision object determining means determines that the object is a human body when the pressure detected by the pressure sensor is greater than the determination threshold value.

3. The collision detection apparatus according to claim 1, further comprising:

a bumper absorber that is provided on a side of the chamber forming member, the bumper absorber having a rigidity in the vehicle fore-and-aft direction, which rigidity changes with the rigidity of the chamber forming member.

4. The collision detection apparatus according to claim 3, wherein the rigidity of the bumper absorber in the vehicle fore-and-aft direction changes with a length of the bumper absorber in the vehicle fore-and-aft direction.

5. The collision detection apparatus according to claim 3, wherein:

the rigidity of each of the chamber forming member and the bumper absorber in the vehicle fore-and-aft direction is higher at an end section of the each of the chamber forming member and the bumper absorber in the vehicle transverse direction than at a center section of the each of the chamber forming member and the bumper absorber in the vehicle transverse direction; and the determination threshold value is set lower when the collision position corresponds to the end section than when the collision position corresponds to the center section.

6. The collision detection apparatus according to claim 3, wherein the side of the chamber forming member faces in a travel direction of the vehicle.

7. The collision detection apparatus according to claim 1, wherein the chamber forming member serves as the bumper absorber.

8. The collision detection apparatus according to claim 1, wherein the rigidity of the chamber forming member in the vehicle fore-and-aft direction changes with a length of the chamber space in the vehicle fore-and-aft direction.

9. The collision detection apparatus according to claim 1, wherein the collision position sensor is provided to one of (a) an end section in the vehicle transverse direction and (b) a center section in the vehicle transverse direction.

10. The collision detection apparatus according to claim 1, wherein the collision position sensor is mounted on a front surface of the chamber forming member.

11. The collision detection apparatus according to claim 1, wherein the side of the bumper reinforcement faces in a travel direction of the vehicle.

12. The collision detection apparatus according to claim 1, wherein:

the collision position sensor is provided only to a position that corresponds to the end section of the chamber forming member.

13. The collision detection apparatus according to claim 1, wherein:

the collision position sensor is provided only to a position that corresponds to the center section of the chamber forming member.

14. A collision detection apparatus for a vehicle, wherein the collision detection apparatus detects collision of an object with the vehicle, the collision detection apparatus comprising:

a bumper reinforcement that is mounted on the vehicle, the bumper reinforcement extending in a transverse direction of the vehicle;

a chamber forming member that is provided at a side of the bumper reinforcement, the chamber forming member defining a chamber space that is deformable when the object collides with the vehicle, wherein the chamber forming member has a rigidity in a fore-and-aft direction of the vehicle, which rigidity changes with a position in the chamber forming member in the vehicle transverse direction;

a pressure sensor that detects pressure in the chamber space;

collision object determining means for determining a category of the object by comparing the pressure detected by the pressure sensor with a predetermined determination threshold value;

a collision position sensor that detects a position in the vehicle transverse direction, at which position the object collides, wherein the collision object determining means changes the determination threshold value based on the collision position detected by the collision position sensor; and a bumper absorber that is provided on a side of the chamber forming member, the bumper absorber having a rigidity in the vehicle fore-and-aft direction, which rigidity changes with the rigidity of the chamber forming member, wherein:

the rigidity of each of the chamber forming member and the bumper absorber in the vehicle fore-and-aft direction is higher at an end section of the each of the chamber forming member and the bumper absorber in the vehicle transverse direction than at a center section of the each of the chamber forming member and the bumper absorber in the vehicle transverse direction;

the determination threshold value is set lower when the collision position corresponds to the end section than when the collision position corresponds to the center section; and the bumper absorber has a length in the fore-and-aft direction of the vehicle, which length is largest at the center section of the bumper absorber, and which length becomes smaller toward the end section of the bumper absorber.

15. The collision detection apparatus according to claim 14, wherein:
the collision position sensor is provided only to a position that corresponds to the end section of the bumper absorber.

16. The collision detection apparatus according to claim 14, wherein:
the collision position sensor is provided only to a position that corresponds to the center section of the bumper absorber.

* * * * *